United States Patent [19]

Gold

[11] 4,153,353
[45] May 8, 1979

[54] FILM TRANSPORT FOR A VIEWER

[75] Inventor: Nicholas Gold, Arlington, Mass.

[73] Assignee: Polaroid Corporation, Cambridge, Mass.

[21] Appl. No.: 865,791

[22] Filed: Dec. 30, 1977

[51] Int. Cl.² ............................................. G03B 23/14
[52] U.S. Cl. ................................ 353/114; 353/DIG. 1
[58] Field of Search .................. 353/103, 9, 112, 114, 353/116, 118, DIG. 1; 40/508-509, 513, 364

[56] References Cited

U.S. PATENT DOCUMENTS

| | | | |
|---|---|---|---|
| 2,849,814 | 9/1958 | Rideout | 353/118 X |
| 3,038,274 | 6/1962 | Nagel | 353/112 |
| 3,264,937 | 8/1966 | Antos | 353/112 |

FOREIGN PATENT DOCUMENTS 16181  7/1968  Japan .................... 353/DIG. 1

*Primary Examiner*—Harry N. Haroian
*Attorney, Agent, or Firm*—Alfred E. Corrigan

[57] ABSTRACT

Apparatus having a chamber for receiving a stack of photographs which are to be sequentially moved into a projection plane whereat their images may be projected onto a viewing screen. One wall of the chamber includes a shelf which is adapted to support one end of the stack of photographs such that, upon initial loading of the stack of photographs into the chamber, the endmost photograph located closest to the projection plane is prevented from falling completely into the projection plane. The apparatus includes an indexing member which is movable into and out of engagement with the one end of the endmost photograph so as to push it off of the shelf thereby enabling it to move substantially fully into the projection plane wherein it defines an acute angle with the next adjacent photograph which is now being supported at one end by the shelf. The relationship of these two photographs is now such that only their ends, i.e., the ends opposite the shelf are in engagement with each other thereby substantially obviating any problem of the two photographs damaging each other, e.g., by scratching each other, during movement of the endmost photograph in a direction away from their engaged ends and toward their said one ends.

6 Claims, 7 Drawing Figures

FILM TRANSPORT FOR A VIEWER

BACKGROUND OF THE INVENTION

1. Field of the Invention

This invention relates to apparatus for sequentially presenting photographs at a projection position whereat their images may be transmitted onto a viewing screen.

2. Description of the Prior Art

Apparatus for sequentially presenting photographs including transparent slides at a projection station or position are well known and generally include a supply chamber for receiving and supporting a plurality of photographs in a stack and a mechanism for sequentially removing an endmost photograph from the stack and advancing it to a projection position whereat its image may be transmitted by a suitable light source onto a viewing screen.

One of the problems with apparatus of the type described is that the sliding movement between the endmost photograph and the next adjacent photograph in the stack, during movement of the endmost photograph into the projection position, may cause damage to one of the photographs. For example, such sliding movement may cause scratching of the image bearing surface of the photographs or, in the case where the photograph is a slide, such movement may be impeded by reason of interference between the edges of the aperture of the slide being moved and the edges of the aperture of the adjacent slide in the stack.

It has been suggested that the above problem may be obviated by positioning the endmost photograph and the next adjacent photograph at an acute angle relative to each other during movement of the endmost photograph into the projection position. Specifically, see U.S. Pat. No. 3,038,270 granted to H. A. Nagel on June 12, 1962 wherein a stack of photographs is supported at a slight angle to a wall of a guideway which leads to a projection position or station. This is accomplished in part by providing the wall with a pair of spaced projections which are adapted to engage the trailing end portion of the endmost photograph for tilting the entire stack at a slight angle relative to the wall of the guideway. The Nagel apparatus includes a changer which is moved in a direction so as to engage the endmost photograph by its trailing end and move its leading edge into a second guideway which is coplanar with the first mentioned guideway. In other words, initial movement of the changer forces the leading edge of the photograph into the second guideway while the trailing end of the photograph is still maintained at an angle with respect to the first guideway. In this position, the photograph is partially bent with the leading end portion thereof parallel with the first guideway and the trailing end portion thereof at an angle thereto. Upon further movement of the photograph, the trailing end portion is no longer maintained or held at an angle with respect to the first guideway and the inherent resiliency in the bent photography causes the trailing end portion thereof to be urged into contact with the first guideway. At this stage of changer movement, a cam formed thereon engages the photograph adjacent the one being moved and further advance of the changer, tilts the adjacent photograph and the remaining photographs in the stack away from the first guideway thereby increasing the angle between the remaining photograhs and the first guideway. Further downward movement of the changer moves a roller into engagement with the photograph adjacent to the one being moved thereby reducing the sliding friction between the cam and the adjacent photograph for minimizing the likelihood of any damage thereto.

While the above described patent recognizes the problem involved in sliding an endmost photograph off of a stack of photographs, it does not go far enough in the solution of the problem. To the contrary, it creates new problems, i.e., the bending of the leading end portion of the photograph as it is entering the second guideway and the friction created between the cam and the next adjacent photograph. Therefore, it can be readily appreciated that there still remains a need to provide an apparatus of the type described which will remove an endmost photograph from a stack of photographs and advance it to a projection position without bending it during such movement. Also the apparatus must keep the frictional engagement between the endmost photograph and the next adjacent photograph a minimum during such movement.

SUMMARY OF THE INVENTION

The instant invention relates to apparatus for sequentially removing an endmost photograph from a stack of photographs and moving it into and out of a projection position whereat its image is projected onto a viewing screen. The apparatus includes a chamber for receiving and supporting a stack of photographs, a projection plane located at one end of the chamber, the plane having a projection position into which a photograph is adapted to be advanced, means including a lamp, a lens and a pair of mirrors for transmitting or projecting the image of a photograph located at the projection position onto a viewing screen, and a mechanism for advancing a photograph into and out of the projection position.

One of the walls of the chamber includes a first opening having a first protrusion or shelf immediately adjacent thereto which, when the stack of photographs is placed in the chamber, engages the leading end of the endmot photograph and supports the stack such that the endmost photograph in the stack cannot fall completely onto the projection plane, i.e., the shelf supports the stack of photographs such that the endmost photograph and the projection plane define an acute angle therebetween. Another wall of the chamber, located directly opposite to the first mentioned wall, is provided with a second shelf having a second opening adjacent thereto in the form of an elongate slot into which a trailing end of each photograph is adapted to be moved prior to advancing the photograph into the projection position. A cam driven frame having a photograph engaging member thereon is provided for engaging the end of the photograph located in the elongate slot and advancing the photograph into the projection position. The frame is adapted to be driven in a reciprocating manner such that after one photograph has been moved away from the projection position the frame is driven in an opposite direction until its photograph engaging member is located just rearwardly of the trailing end of the next photograph to be removed from the stack. At this moment, an arm forming an integral part of the frame, moves into engagement with a member which, when activated by such engagement moves along the first opening until it engages the leading edge of the next photograph to be viewed. Further movement of the frame results in the actuated member initially moving the photograph along the first shelf such that as its leading edge approaches the edge of the first shelf, the trailing edge of the photograph moves along the second shelf and into the second opening in the chamber's wall. Final movement of the actuated member into the chamber moves the leading edge of the photograph off of the first shelf thereby enabling it to fall substantially but not completely into the projection plane. In other words, a major surface of the frame moves along the projection plane and is adapted to fully support the photograph when it is in the projection position. However, when the leading edge of the photograph is moved off of the first shelf such that it may fall onto the major surface of the frame, its trailing end is still being supported by the second shelf which is slightly spaced from the plane of the aforementioned major surface by approximately 4.76 mm. The frame is then reciprocated in the opposite direction until the mechanism for advancing the photograph moves into engagement with its trailing edge and advances it into its projection position whereat it is fully supported by the major surface of the frame. The photograph's image is then projected onto the viewing screen and after viewing has been completed the cycle is repeated again for the next photograph.

An object of the invention is to provide apparatus for sequentially moving an endmost photograph from a stack of photographs into a position wherein its image may be projected onto a viewing screen, such movement being affected with a minimum of sliding friction between the endmost photograph and the next adjacent photograph in the stack.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 1:
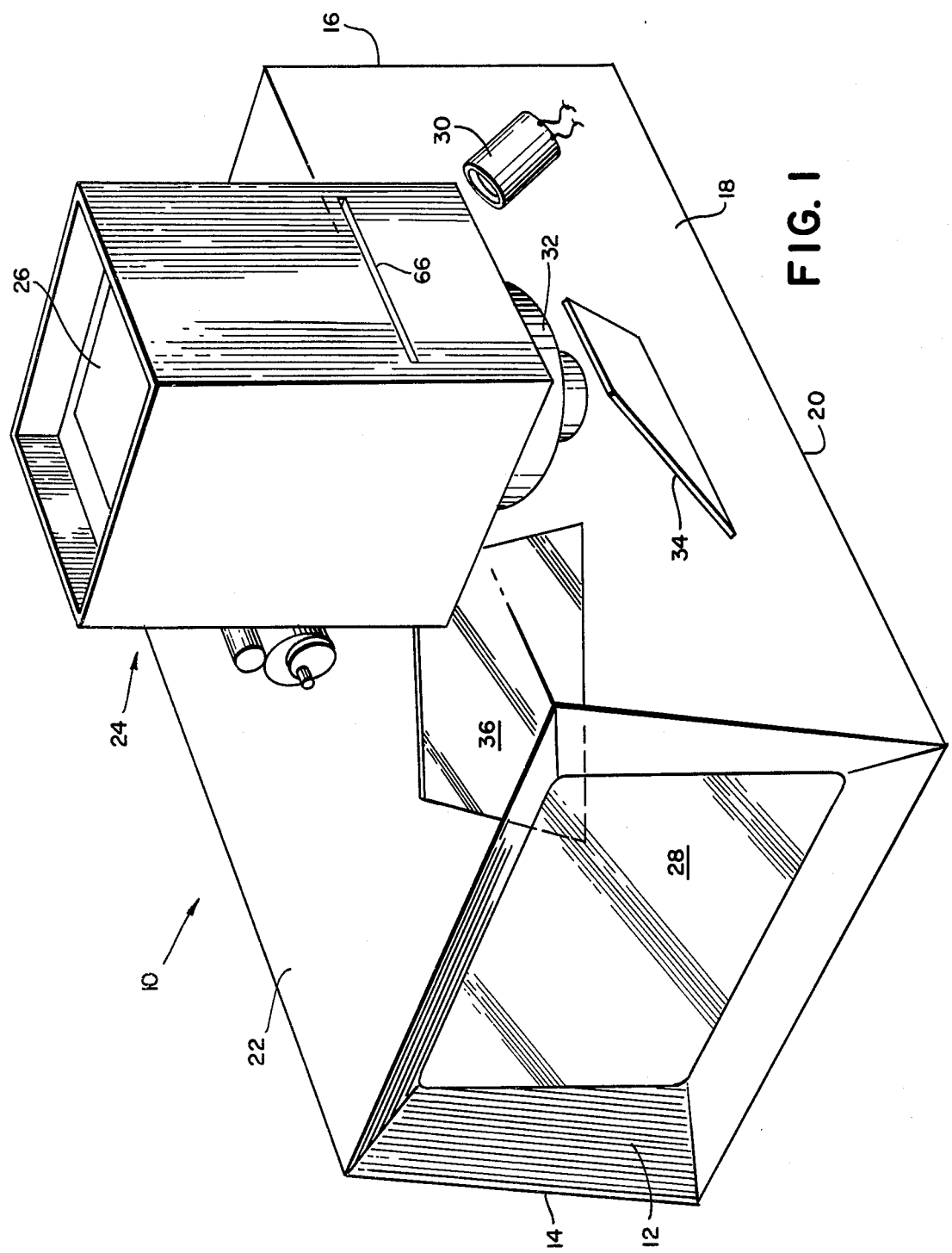
FIG. 1 is a perspective view of certain features of the apparatus of the instant invention, the housing of the apparatus being shown in phantom in order to clearly show internal structure.

Reference is now made to FIG. 1 of the drawing wherein is shown a preferred embodiment of the instant invention. The preferred embodiment of the invention is shown in FIG. 1 in the form of an episcope 10 having a main housing defined by a plurality of interconnected walls 12, 14, 16, 18, 20 and 22. Extending upwardly from the wall 22 is a four-side chamber 24 which is adapted to receive a stack of photographs 26. The wall 12 is provided with a rear projection viewing screen 28 onto which the visible image in a photograph is adapted to be photographed. The image in the photograph is illuminated by a suitable light source 30 and is transmitted to the screen 28 by a lens assembly 32, a first mirror 34 positioned at a 45° angle relative to the axis of the lens assembly 32, and a second mirror 36 which is positioned at a 45° angle relative to the plane of the mirror 34 and the screen 28 and at a 90° angle relative to the bottom wall 20. After the photograph has been viewed, it is advanced away from its projection position by the apparatus shown in FIG. 2 which is suitably enclosed and supported by a three-sided enclosure 38.

Figure 2:
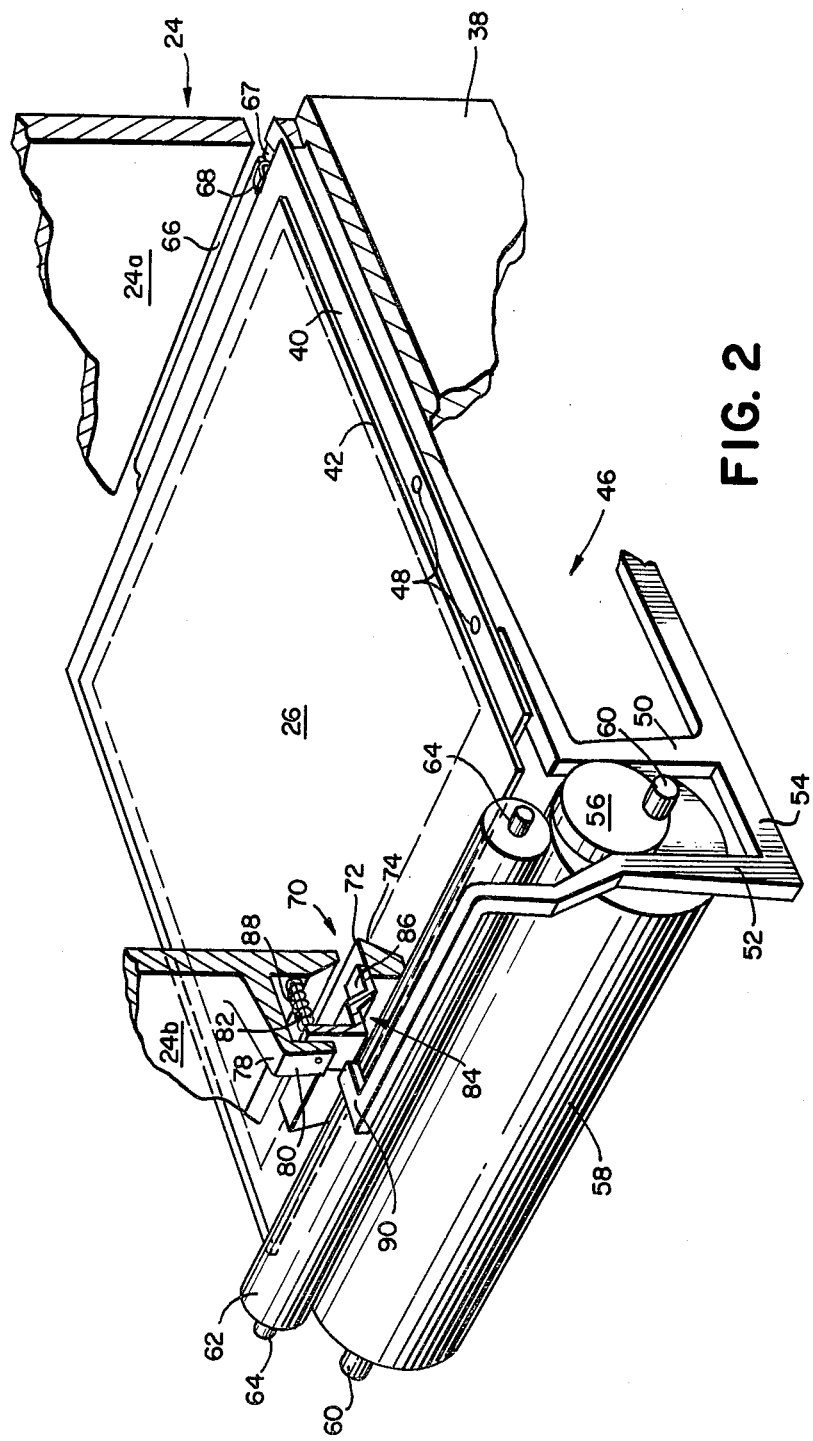
FIG. 2 is a perspective view of a portion of the invention showing a photograph located in position to have its image projected onto a viewing screen, certain elements being broken away for purposes of clarity.

Reference is now made to FIG. 2 wherein is shown the apparatus for advancing the photographs 26 out of its projection position. Specifically, FIG. 2 shows a rectangular plate 40 having an aperture 42 therein which is generally coextensive with the image area of the photograph to be viewed. The plate 40 is attached to an arm 44 of a frame 46 by a pair of rivets 48. The frame 46, which is suitably mounted to the enclosure 38 for reciprocating motion, includes a U-shaped section defined by a pair of spaced parallel legs 50 and 52 interconnected by a section 54. The legs 50 and 52 are adapted to receive a circular cam 56 which is fixedly secured to one end of a roller 58. The roller 58 includes a pair of stub shafts 60, one of which extends through the cam 56, which are adapted to be suitably journaled in the walls of the enclosure 38 for rotation in a counterclockwise manner, as viewed in FIG. 2. Suitable means (not shown) are provided for driving the roller 58. Mounted adjacent to the roller 58 is a second roller 62 of smaller diameter which is adapted to cooperate with the roller 58 to complete the movement of a photograph from its projection position to its storage position, as will be explained hereinafter. The roller 62 is provided with a pair of shafts 64 which are journaled in the walls of the enclosure 38.

As best seen in FIG. 2, one end wall 24a of the chamber 24 is provided with an elongate slot 66 which is adapted to receive a trailing end section (to the right as viewed in FIGS. 2-7) of a photograph. The slot 66 is also recessed at 67 to receive a member 68 which is fixedly secured to the frame 40 and is adapted to engage the trailing end of a photograph 26 prior to advancing the photograph into its projection position. An opposite end wall 24b of the chamber 24 is provided with an opening 70 having an elongate shelf 72 extending inwardly therefrom. The shelf 72 includes a sloping surface 74 which terminates at an exit opening 76 in the end wall 24b.

Extending outwardly from the wall 24b is an arm 78 having a downwardly turned portion 80. The portion 80 and the end wall 24b are provided with means (not shown) for receiving the opposite ends of a rod 82. Slidably mounted on the rod 82 is a photograph pusher 84 having an end portion 86 which is adapted to move along the opening 70, i.e., toward and away from the wall 24a. The pusher 84 is biased by a spring 88 to a position wherein the end portion 86 is to the left of the interior surface of the wall 24b. The pusher is adapted to be moved to the right against the bias of the spring 88 by an actuator 90 which is an integral extension of the leg 52. of the frame 46.

Figure 3:
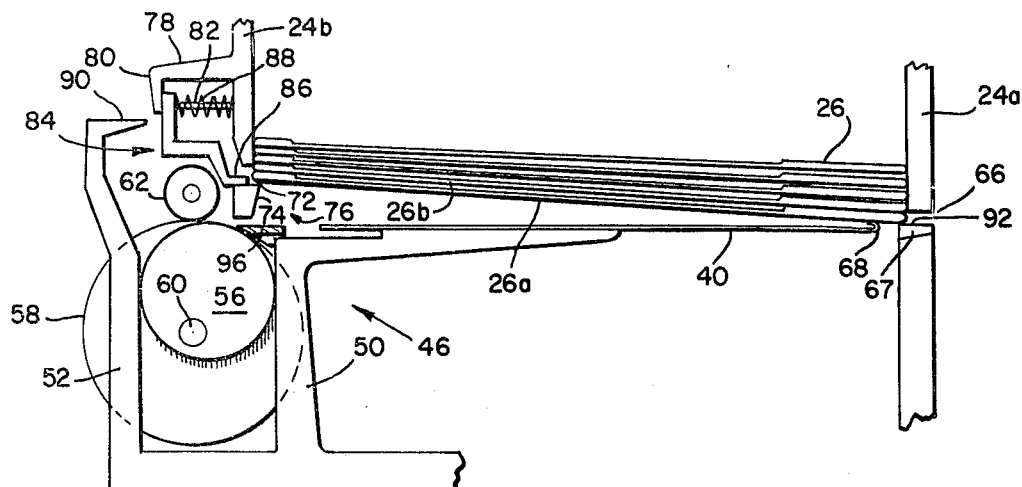
FIG. 3 is a side elevational view, partially broken away, showing the spatial relationship between various elements of the apparatus at the beginning of a viewing cycle.

Reference is now made to FIG. 3 of the drawings which shows the relationship between various elements of the apparatus when a stack of photographs 26 has been placed in the chamber 24. It will be noted that the endmost photograph 26a in the stack is initially prevented from falling completely onto the rectangular plate 40 by the shelf 72 and a shelf 92 located in alignment with the slot 66. After the stack of photographs 26 has been placed in the chamber 24, an electrical circuit is energized to start a viewing cycle. Initial rotation of the roller 58 in a counterclockwise manner results in the cam 56 applying a force against the leg 52 of the frame 46 thereby causing the latter to move to the left. As the roller continues to rotate, the cam moves to a position wherein it now applies a force against the leg 50 thereby causing the frame 46 to move to the right until it reaches the position shown in FIG. 5. During this reciprocating movement of the frame 46, the rectangular plate 40 has moved along a plane which may be called a projection plane. Also, it will be noted that during the movement of the frame 46 to the left no photograph was moved along the projection plane by the photograph engaging and advancing member 68 because it was initially located to the left of the trailing end of the endmost photograph 26b, as seen in FIG. 3.

Figure 4:
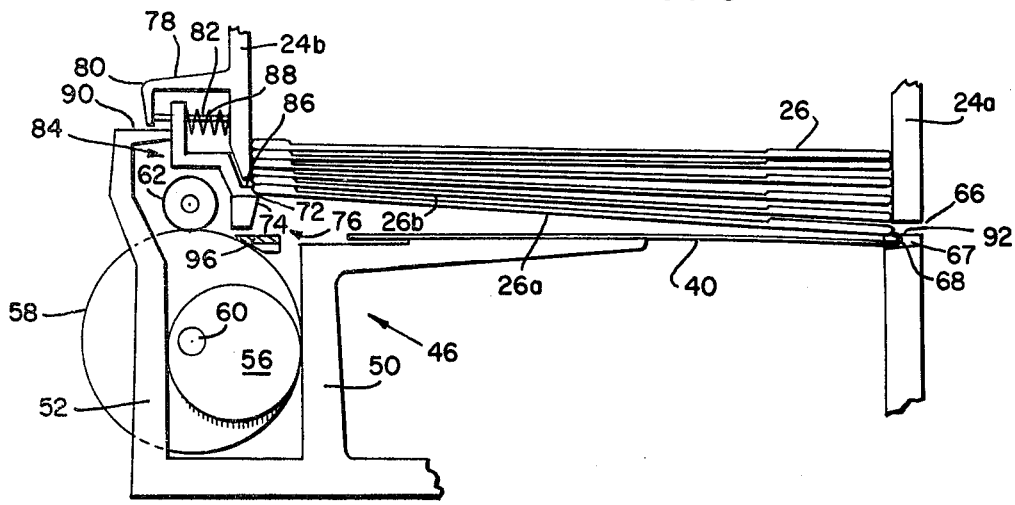
FIG. 4 is a view similar to FIG. 3 showing the spatial relationship between various elements of the apparatus near the end of a viewing cycle at which time an endmost photograph in a stack of photographs is about to be moved substantially fully into a projection plane.
Figure 5:
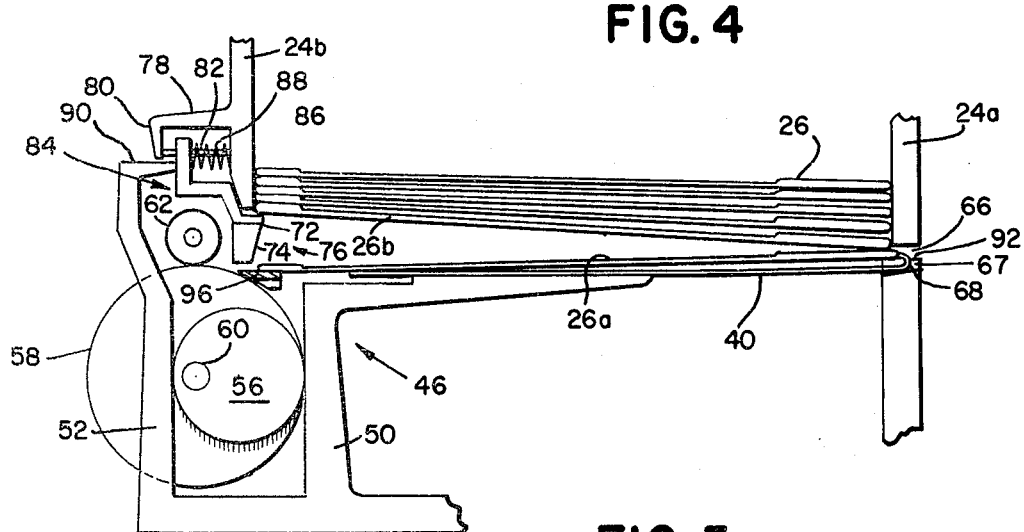
FIG. 5 is a view similar to FIGS. 3 and 4 showing the spatial relationship between the elements at the time that the endmost photograph has moved substantially fully into the projection plane of the apparatus.
Figure 6:
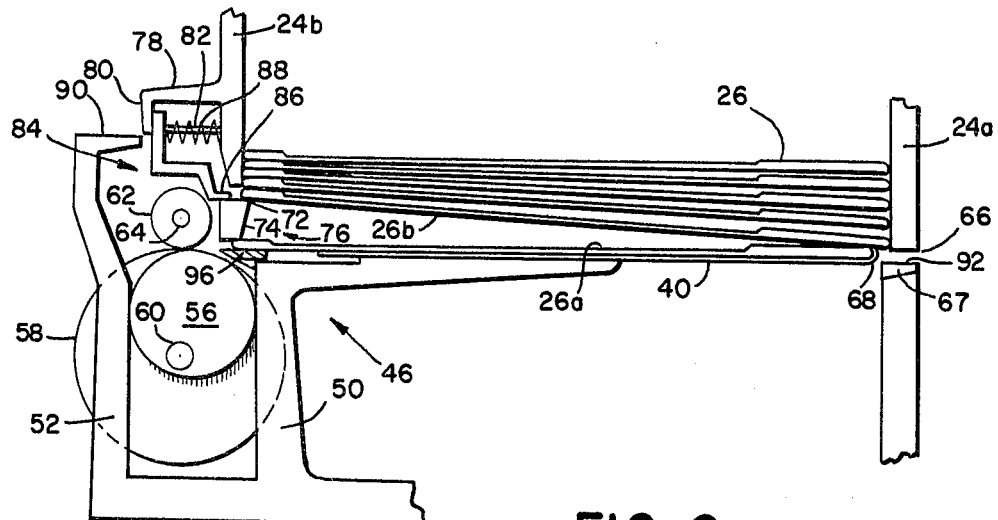
FIG. 6 is a view similar to FIGS. 3-5 showing the spatial relationship between the various elements at the time the endmost photograph has been mvoed into a position wherein its image may be projected or transmitted onto a viewing screen.
Figure 7:
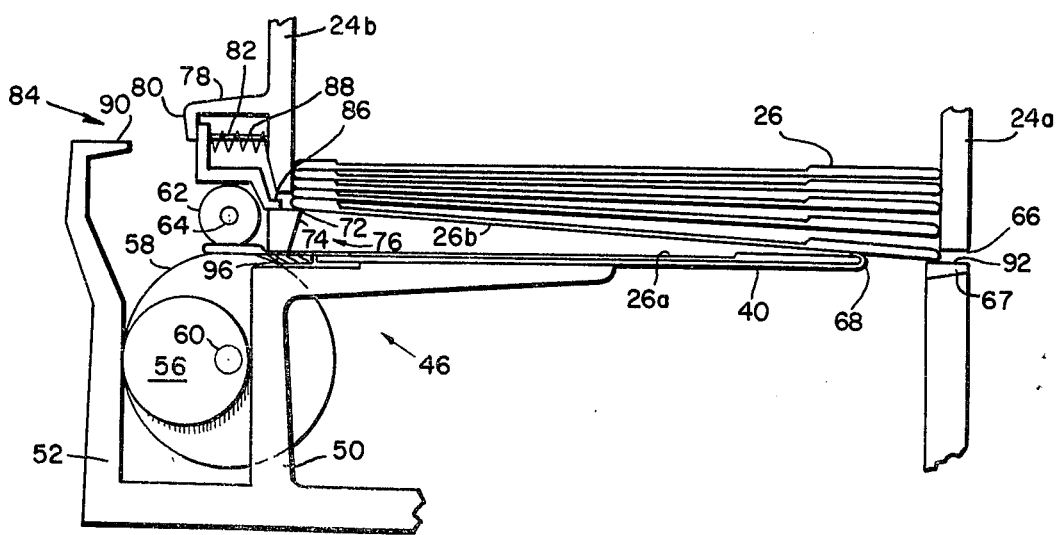
FIG. 7 is a view similar to FIGS. 3-6 showing the spatial relationship between the various elements at the time that the endmost photograph has been moved away from its projection position and into the bite of a pair of rollers.

Just prior to the frame being moved into the position shown in FIG. 5, it passes through the position shown in FIG. 4. As the frame 46 moves to the right and enters the position shown in FIG. 4, the actuator 90 engages the photograph pusher 84 and moves its end portion 86 into engagement with the leading end of the endmost photograph 26a. Further movement of the frame 46 to the right results in the end portion 86 moving the leading end of the endmost photograph toward the edge of the shelf 72 while simultaneously moving the trailing edge of the endmost photograph into the slot 66. Just prior to this, the member 68 has entered the slot 66 and has been cammed upwardly by the inclined surface of the recess 67 to a position wherein it is in alignment with the trailing end of the endmost photograph 26a.

As the frame moves from the FIG. 4 position to the position shown in FIG. 5, the end portion 86 of the pusher 84 moves the leading end of the endmost photograph 26a off of the shelf 72 so as to enable it to fall substantially into the projection plane. As stated hereinbefore, the shelf 92, at this time in the cycle, prevents the photograph 26a from falling completely into the projection plane, i.e., it prevents it from falling completely onto the surface of the rectangular member 40. The cycle is completed by further rotating the roller 58 until the cam 56 has moved the frame from the FIG. 5 position to the FIG. 6 position. During this movement the photograph engaging and advancing member 68 moves into engagement with the trailing edge of the endmost photograph 26a and advances the photograph into and along the projection plane until it reaches its projection position shown in FIG. 6. If, during movement of the photograph into the projection position, the leading end portion of this is out of alignment with the exit 76 in the chamber 24, the sloping surface 74 functions cam the leading edge portion downwardly and toward the exit 76 so as to releasably wedge it between a stationary shelf 96 and the surface directly under the inclined surface 74, as clearly shown in FIG. 6. Also, it should be noted in FIG. 6 that the trailing end portion of the photograph 26a is maintaining the trailing end portion of the next adjacent photograph 26b out of alignment with the elongate slot 66 thereby insuring that the latter photograph cannot be moved substantially into the projection plane until the photograph 26a has been moved out of its projection position. The visible image in the photograph 26a is then illuminated by the light source 30 and the resulting reflected image is projected by the lens assembly 32 and the mirrors 34 and 36 onto the viewing screen 28. After the photograph 26a has been viewed, another viewing cycle is started by rotating the roller 58 through another complete revolution. During the first part of the viewing cycle, the cam 56 causes the frame 46 and its associated photograph engaging member 68 to move to the left, as viewed in FIGS. 6 and 7 thereby moving the leading end of the endmost photograph into the bite of the rollers 58 and 62 which, in turn, continue the advancement of the photograph away from its projection position and into a storage compartment (not shown). During the early portion of the movement of the photograph 26a toward the bite of the rollers 58 and 62, the only sliding contact between it and the adjacent photograph 26b takes place at their trailing end portions. Because of the angular relationship between the stationary photograph 26b and the moving photograph 26a, the aforementioned sliding contact ends before the trailing end of the photograph 26a passes across the image area of the photograph 26b. For example, the photographs 26 shown herein are preferably of the integral self-developing type film units sold by Polaroid Corporation under the trademark SX-70. Each of these photographs contains an image area bordered at one end by an enlarged section which prior to processing contained a processing agent, and at its opposite end by a smaller enlarged trap section, which is adapted to receive any excess processing agent which remains after the agent has been spread across the image area of the film unit, as is well known in the art. After the photograph 26a has been advanced into the bite of the rollers 58 and 62, the cam 56 reaches a position wherein it starts to drive the frame 46 to the right thereby causing the actuator 90 to move the pusher to the right thereby knocking the leading end of the photograph off of the shelf 72 thereby allowing it to fall substantially into the projection plane, as described hereinbefore. As the roller 58 nears the end of its 360° rotation the cam 56 reverses the direction of movement of the frame 46 until it reaches the position shown in FIG. 6 at which time the drive to the roller 58 is stopped.

Since certain changes may be made in the above apparatus without departing from the scope of the invention herein involved, it is intended that all matter contained in the above description or shown in the accompanying drawings shall be interpreted as illustrative and not in a limiting sense.

what is claimed is:

1. Apparatus for sequentially presenting photographs at a projection position whereat their images may be transmitted onto a viewing screen, said apparatus comprising:

means for defining a chamber for receiving a stack of photographs, said chamber defining means including means for preventing an endmost photograph in the stack from moving completely into a projection plane during loading of the stack of photographs into said chamber and means defining an exit through which a photograph is adapted to be advanced out of said chamber;

means for moving a leading edge of the endmost photograph out of engagement with said preventing means and partially out of engagement with the next adjacent photograph in the stack and substantially into the projection plane wherein only the trailing ends of the endmost and next adjacent photographs are in contact with each other;

means for advancing the endmost photograph in the direction of its leading edge along the projection plane into a projection position while said preventing means maintains the next adjacent photograph partially out of engagement therewith thereby substantially obviating any problem of the endmost and the next adjacent photographs damaging each other during said movement of the endmost photograph along the projection plane, said advancing means including means adapted to engage the endmost photograph by its edge prior to moving it into and away from the projection position; and means for transmitting the image of the endmost photograph supported at the projection position onto the viewing screen.

2. Apparatus as defined in claim 1 further including means for receiving the endmost photograph as it is moved out of the projection position by said photograph engaging means and completing the movement of the endmost photograph out of the projection position.

3. Apparatus as defined in claim 2 further including a cam coupled to said receiving means for actuating said advancing means to move the endmost photograph away from the projection position and into engagement with said receiving means.

4. Apparatus as defined in claim 3 wherein said advancing means includes a frame adapted to be actuated by movement of said cam, said frame including means adapted to actuate said moving means so as to engage and move one end of the next adjacent photograph in the stack off of said preventing means and partially out of engagement with the then penultimate photograph in the stack and substantially into the projection plane.

5. Apparatus for sequentially presenting photographs at a projection position whereat their images may be transmitted onto a viewing screen, said apparatus comprising:

means for defining a chamber for receiving a stack of photographs, said chamber defining means including means for preventing an endmost photograph in the stack from moving completely into a projection plane during loading of the stack of photographs into said chamber and means defining an exit through which a photograph is adapted to be advanced out of said chamber, said exit defining means including a cam which is adapted to be engaged by an edge of the endmost photograph as it is being advanced along the projection plane so as to wedge the edge of the endmost photograph into said exit thereby releasably securing the endmost photograph in the projection position;

means for moving a leading edge of the endmost photograph; out of engagement with said preventing means and partially out of engagement with the next adjacent photograph in the stack and substantially into the projection plane wherein only the trailing ends of the endmost and next adjacent photographs are in contact with each other;

means for advancing the endmost photograph in the direction of its leading edge along the projection plane into a projection position while said preventing means maintains the next adjacent photograph partially out of engagement therewith thereby substantially obviating any problem of the endmost and the next adjacent photographs damaging each other during said movement of the endmost photograph along the projection plane; and means for transmitting the image of the endmost photograph supported at the projection position onto the viewing screen.

6. Apparatus for sequentially presenting photographs at a projection position whereat their images may be transmitted onto a viewing screen, said apparatus comprising:

means for defining a chamber for receiving a stack of photographs, said chamber defining means including means for preventing an endmost photograph in the stack from moving completely into a projection plane during loading of the stack of photographs into said chamber and means defining an exit through which a photograph is adapted to be advanced out of said chamber;

means for moving a leading edge of the endmost photograph out of engagement with said preventing means and partially out of engagement with the next adjacent photograph in the stack and substantially into the projection plane wherein only the trailing ends of the endmost and next adjacent photographs are in contact with each other;

means for advancing the endmost photograph in the direction of its leading edge along the projection plane into a projection position while said preventing means maintains the next adjacent photograph partially out of engagement therewith thereby substantially obviating any problem of the endmost and the next adjacent photographs damaging each other during said movement of the endmost photograph along the projection plane, said advancing means being adapted to move the endmost photograph in the direction of its leading end out of the projection position, initial movement of the endmost photograph out of the projection position being effective to move the trailing ends of the endmost and next adjacent photographs out of engagement with each other; and means for transmitting the image of the endmost photograph supported at the projection position onto the viewing screen.

* * * * *